(12) United States Patent
Friedrich et al.

(10) Patent No.: US 7,805,124 B2
(45) Date of Patent: Sep. 28, 2010

(54) LOW-LOSS FREQUENCY PATTERN GENERATOR

(75) Inventors: Martin Friedrich, Gelsenkirchen (DE);
Christian Grewing, Sollentuna (SE);
Giuseppe Li Puma, Bochum (DE);
Christoph Sandner, Villach (AT);
Andreas Wiesbauer, Pörtschach (AT);
Kay Winterberg, Kempen (DE); Stefan Van Waasen, Sollentuna (DE)

(73) Assignee: Infineon Technologies AG, Munich (DE)

( * ) Notice: Subject to any disclaimer, the term of this patent is extended or adjusted under 35 U.S.C. 154(b) by 1371 days.

(21) Appl. No.: 11/115,069

(22) Filed: Apr. 25, 2005

(65) Prior Publication Data
US 2005/0255822 A1 Nov. 17, 2005

(30) Foreign Application Priority Data
Apr. 23, 2004 (DE) ............... 10 2004 020 031

(51) Int. Cl.
*H04B 1/26* (2006.01)
(52) U.S. Cl. .................. 455/323; 455/109; 455/103; 455/110; 375/130; 375/132; 375/133
(58) Field of Classification Search .......... 455/323, 455/109, 103, 110; 375/130, 132, 133
See application file for complete search history.

(56) References Cited

U.S. PATENT DOCUMENTS 7,035,310 B1* 4/2006 Roberts ............... 375/132
7,218,898 B2* 5/2007 Abdellaoui et al. ......... 455/109
2004/0131130 A1* 7/2004 Shor et al. ................ 375/308
2005/0003785 A1* 1/2005 Jackson et al. ............ 455/260
2005/0013344 A1* 1/2005 Abdellaoui et al. ........ 375/130

OTHER PUBLICATIONS

Lu et al., "A Digital Ultra-Wideband Multiband Transceiver Architecture with Fast Frequency Hopping Capabilities", 2003 Conference on Ultra Wideband Systems and Technologies, Nov. 2003, pp. 448-452, (5 pages).
Shor et al., "TG3a-Wisair Contribution on Multi-Band Implementation", IEEE P802.15 Working Group for Wireless Personal Area Networks, May 5, 2003, (16 pages).

* cited by examiner

*Primary Examiner*—Sanh D Phu
(74) *Attorney, Agent, or Firm*—Maginot Moore Beck

(57) ABSTRACT

Frequency pattern generator (1, 101, 201) for generating frequency pulses, said generator having a first local oscillator unit (2-1, 121, 221) for generating a first radio frequency carrier frequency signal (LO1), at least one second local oscillator unit (2-2, ... 2-N, 122, 222) for generating at least one second radio frequency carrier frequency signal (LO2), a switching device (3, 103, 203) for passing on one of the radio frequency carrier frequency signals (LO1, LO2) or a zero signal (DC) in a manner dependent on a control signal (CTR), and a mixing stage (9, 109, 209, 212, 309) for mixing the signal (LO) that has been passed on by the switching device (3, 103, 203) with a mixing frequency signal (LF) to form a pulsed output signal (RFOUT), the pulsed output signal (RFOUT) having frequency pulses at a respective frequency (f1, ... f8) and length (Tp) in a manner dependent on the control signal (CTR).

20 Claims, 5 Drawing Sheets

LOW-LOSS FREQUENCY PATTERN GENERATOR

FIELD OF THE INVENTION

The present invention relates to a low-loss frequency pattern generator for generating frequency pulses over a wide range of frequencies, it being possible to switch the various frequencies of said frequency pulses in a rapid manner.

BACKGROUND

Future wire-free data transmission for high data transmission rates will occupy a very wide bandwidth. Standards for UWB (Ultra Wide Band) applications provide a frequency range of 3 to 10 GHz. In order to transmit data over this bandwidth range, a large number of transmission bands, for example for OFDM (Orthogonal Frequency Division Multiplexing) or DS-CDMA (Direct Sequence Code Division Multiplexes), must be generated in this frequency range.

Frequency pattern generators or hopping frequency synthesizers are generally used for this purpose. Frequency pattern generators of this type must provide frequency pulses having an adjustable time duration and a frequency that varies from pulse to pulse. Such pulsed output signals then form a suitable frequency spectrum that has a large number of transmission bands over an extremely wide frequency band range (UWB=Ultra Wide Band).

FIG. 1 shows one possible sequence of frequency pulses in the time domain. An exemplary pulsed signal RFOUT is illustrated as a function of time t. A first frequency pulse of duration Tp at the frequency f1 is followed, after a period of time Tb, by a second frequency pulse at a second frequency f2. A third frequency pulse at a third frequency f3 is also shown by way of example.

Ideally, no signal occurs between the frequency pulses. Depending on the UWB application, the pause between frequency pulses may be very short, down to Tb=Tp. The period of time between two pulses at different frequencies is generally in the nanosecond range.

A multiband generator for generating frequency pulses was proposed in the document IEEE 802.15-03/207r0, G. Shore et al. "TG3a-Wisair contribution on multi band implementation", http://grouper.ieee.org/groups/802/15, May 2003.

FIG. 2 schematically illustrates a corresponding multiband generator MBG. In the latter, a clock signal CLK at 5280 MHz is supplied to a subband generator SBG. The subband generator SBG has a number of frequency dividers (not illustrated here) and outputs reduced frequency signals LF1, LF2, LF3, LF4 at the frequencies 440, 880, 1320, 1760 MHz. The subband generator also passes on the clock signal CLK as a carrier frequency signal LO.

A quintuple multiplexer MUX is provided and outputs either the reduced frequency signals LF1, LF2, LF3, LF4 or a signal DC at a constant level to a single-sideband mixer SSBU/L as a mixing frequency signal LF. The single-sideband mixer SSBU/L also receives the radio frequency clock signal as a local oscillator signal LO.

The single-sideband mixer SSBU/L thus mixes the fixed carrier frequency signal LO with the switched mixing frequency signals LF1, LF2, LF3, LF4 to form an output signal MBOUT of the multiband generator MBG. Different frequencies of the output signal MBOUT are thus achieved by switching the mixing frequencies LF1, LF2, LF3, LF4. Frequency pulses are generated by routing the signal DC at a constant level to the single-sideband mixer SSBU/L as a mixing frequency signal between switching from one mixing frequency, for example LF1, to a second mixing frequency, for example LF2.

A multiband generator in accordance with the prior art, as is shown in FIG. 2, has a number of disadvantages. Since the mixing frequency signals LF1, LF2, LF3, LF4 are generated from a clock signal CLK, higher harmonic components which have to be removed downstream of the multiplexer by means of analog low-pass filters can easily be generated in the subband generator SBG. Low-pass filters of this type in the path for the mixing frequency signals LF disadvantageously slow down the switching properties for switching between various frequencies.

A further disadvantage resides in the fact that the radio frequency carrier frequency LO scatters into the output signal MBOUT even when a constant level is applied, as the mixing frequency signal LF, to the single-sideband mixer SSBU/L. No clean frequency pulses and, in particular, no well-defined pauses between the frequency pulses are thus produced.

SUMMARY

Therefore, one object of the present invention is to provide a frequency pattern generator for generating frequency pulses, in which the different frequencies of said frequency pulses can be switched in a rapid manner, and practically no oscillating signal is output between the frequency pulses.

This object is achieved by a frequency pattern generator for generating frequency pulses according to embodiments of the present invention.

Accordingly, a frequency pattern generator for generating frequency pulses is provided, said generator having: (a) a first local oscillator unit for generating a first radio frequency carrier frequency signal; (b) at least one second local oscillator unit for generating at least one second radio frequency carrier frequency signal; (c) a switching device for passing on one of the radio frequency carrier signals or a zero signal in a manner dependent on a control signal; and having (d) a mixing stage for mixing the signal that has been passed on by the switching device with a mixing frequency signal to form a pulsed output signal; the pulsed output signal having frequency pulses at a respective frequency and length in a manner dependent on the control signal.

The basic idea of the present invention is to supply various local oscillator frequencies (which can be switched) to a mixer in order to generate various frequencies of the frequency pulses and of the pulsed output signal. The pauses between pulses at different frequencies are achieved by passing a zero signal at a constant level to the mixing stage as a carrier frequency. Changing the mixing frequency signal (which is at a low frequency with respect to the carrier signals) achieves a fine graduation for the frequencies of the frequency pulses.

The frequency pattern generator according to the invention has the advantage, in particular, that scattering into the output signal cannot occur between the frequency pulses as a result of a zero signal being applied. Selecting the first and second radio frequency carrier frequency signals also makes it possible to achieve a particularly wide frequency band, as a result of which the frequency pattern generator according to the invention is ideally suited to use in UWB applications. Switching the carrier frequency signals also makes it possible to dimension the frequency bandwidth of the mixing frequency signal to be narrow.

The mixing stage advantageously has a single-sideband mixer. The at least one local oscillator unit advantageously has a voltage-controlled LC circuit, which provides a sinusoidal oscillation as a carrier frequency signal. Using an LC circuit practically precludes higher harmonics which can be generated by the mixing stage.

In one preferred embodiment, at least one digital-to-analog converter and a memory having digital sinusoidal data are provided. In this case, the digital-to-analog converter converts the digital sinusoidal data to an analog mixing frequency signal. A low-pass filter is then particularly advantageously connected downstream of the digital-to-analog converter.

The carrier frequency signals are preferably at frequencies of between 3 and 9 GHz. The mixing frequency signal is preferably at frequencies of between 0 and 1 GHz.

In one preferred embodiment of the frequency pattern generator, the switching devices has a multiplexer.

The frequency pattern generator is preferably embodied in integrated fashion using CMOS technology. This achieves a particularly low power consumption and enables use in large-scale integrated UWB applications.

The subclaims and the description relating to the figures relate to further advantageous refinements and developments of the invention.

The invention is explained in more detail below with reference to the schematic figures and the exemplary embodiments. In this case:

BRIEF DESCRIPTION OF THE DRAWINGS

FIGS. 1 and 2 have already been described in the introduction to the description.

FIG. 3 shows a basic circuit diagram of a frequency pattern generator 1 according to the invention.

Figure 1:
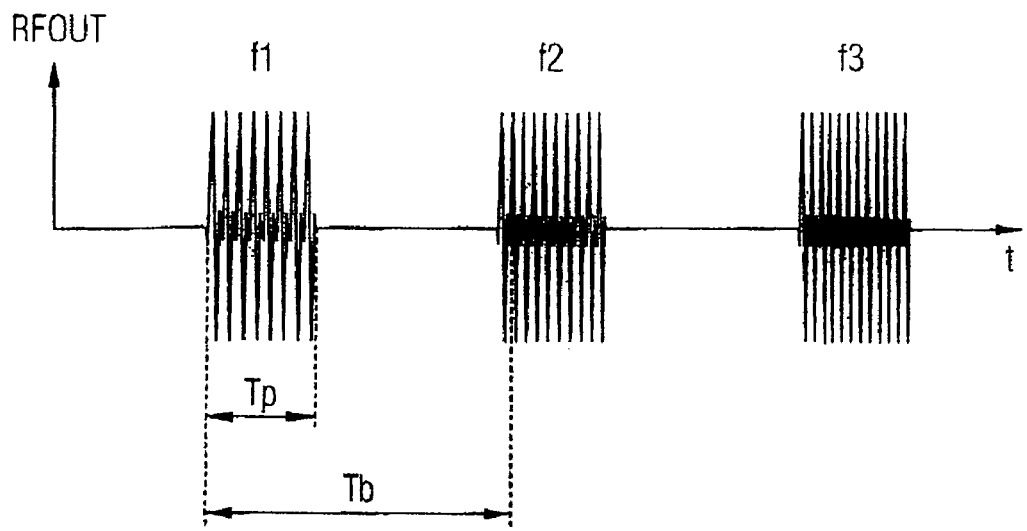
FIG. 1 shows a desired frequency pulse train.
Figure 2:
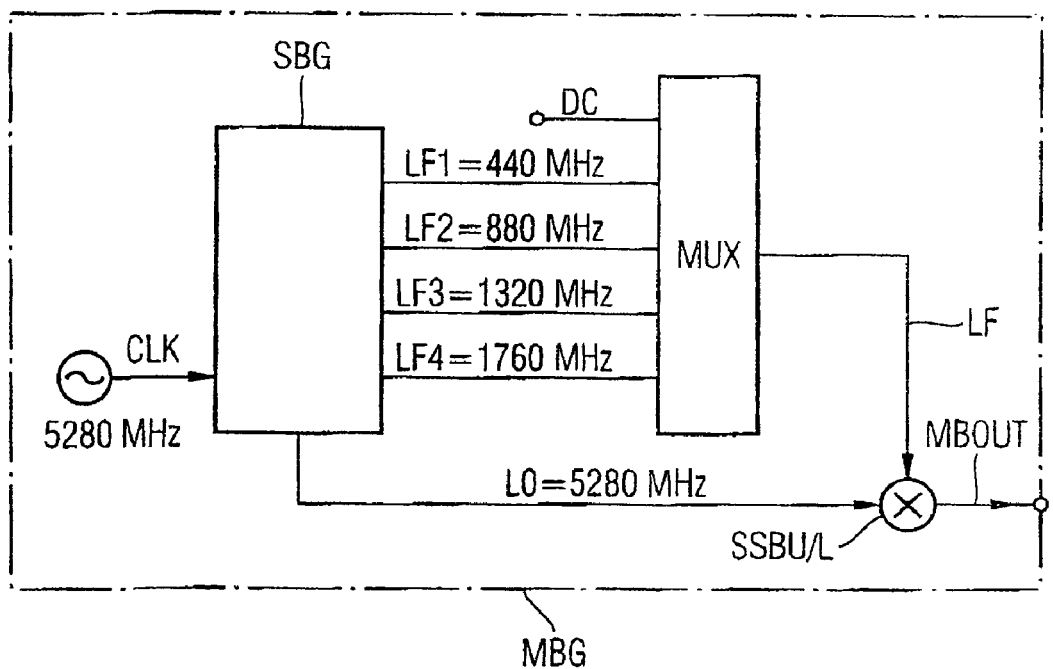
FIG. 2 shows a multiband generator in accordance with the prior art.
Figure 3:
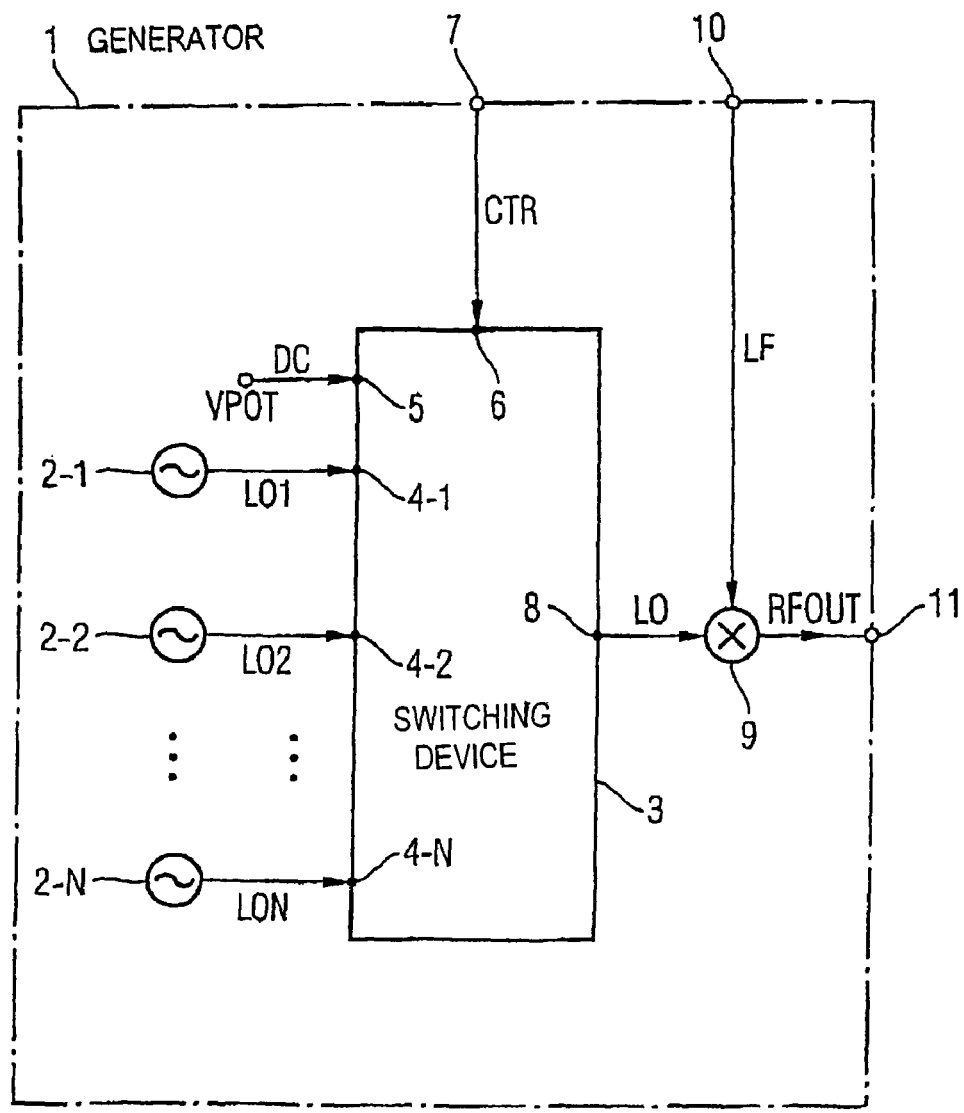
FIG. 3 shows a basic circuit diagram of the frequency pattern generator according to the invention.

The frequency pattern generator 1 has first, second and further local oscillator units 2-1, 2-2, . . . 2-N which respectively generate a radio frequency carrier frequency signal LO1, LO2, . . . LON.

DETAILED DESCRIPTION

A switching device 3 is provided, into which the radio frequency carrier frequency signals LO1, LO2, . . . LON are injected via the inputs 4-1, 4-2, . . . 4-N of said switching device. A zero signal DC at a constant level VPOT is routed to a zero signal input 5 of the switching device 3. The switching device 3 has a control input 6, to which a control signal CTR is routed. The control signal CTR is supplied to the frequency pattern generator 1 via an input 7. In a manner dependent on the control signal CTR, the switching device 3 passes on one of the radio frequency carrier frequency signal LO1, LO2, . . . LON or the zero signal DC to an output 8. The signal that has been passed on is used as a local oscillator signal LO.

The frequency pattern generator 1 also has a mixing stage 9, to which a mixing frequency signal LF and the signal LO (which has been switched through as a local oscillator signal) are supplied. The mixing frequency signal LF is injected into the frequency pattern generator 1 via an input 10. The mixing stage 9 mixes the local oscillator signal LO with the mixing frequency signal LF to form an output signal RFOUT. In this case, the output signal RFOUT has frequency pulses at a respective frequency and length in a manner dependent on the control signal CTR. The pulsed output signal RFOUT can be tapped off at an output 11 of the frequency pattern generator 1.

The control signal CTR determines which of the signals DC, LO1, LO2, . . . LON is output, as a local oscillator signal LO, to the mixing stage 9 by the multiplexer 3. By way of example, the first carrier frequency signal LO1 is first of all passed on for a particular period of time given a mixing frequency signal LF that is kept constant. In response to the control signal CTR, the multiplexer 3 then passes on the zero signal DC to the mixing stage 9. A first frequency pulse whose frequency is determined by the first carrier frequency signal LO1 and the mixing frequency signal LF is thus generated. Applying a zero signal at a constant level VPOT generates a pause in the output signal RFOUT, during which pause no signal or a zero signal is ideally output. After a predetermined pause period has elapsed, the multiplexer 3 then, for example, passes on the second carrier frequency signal LO2 to the mixing stage 9 as a local oscillator signal LO. This second frequency pulse generated is then at a different frequency to the first. Repeated switching thus generates frequency pulses at different frequencies.

Figure 4:
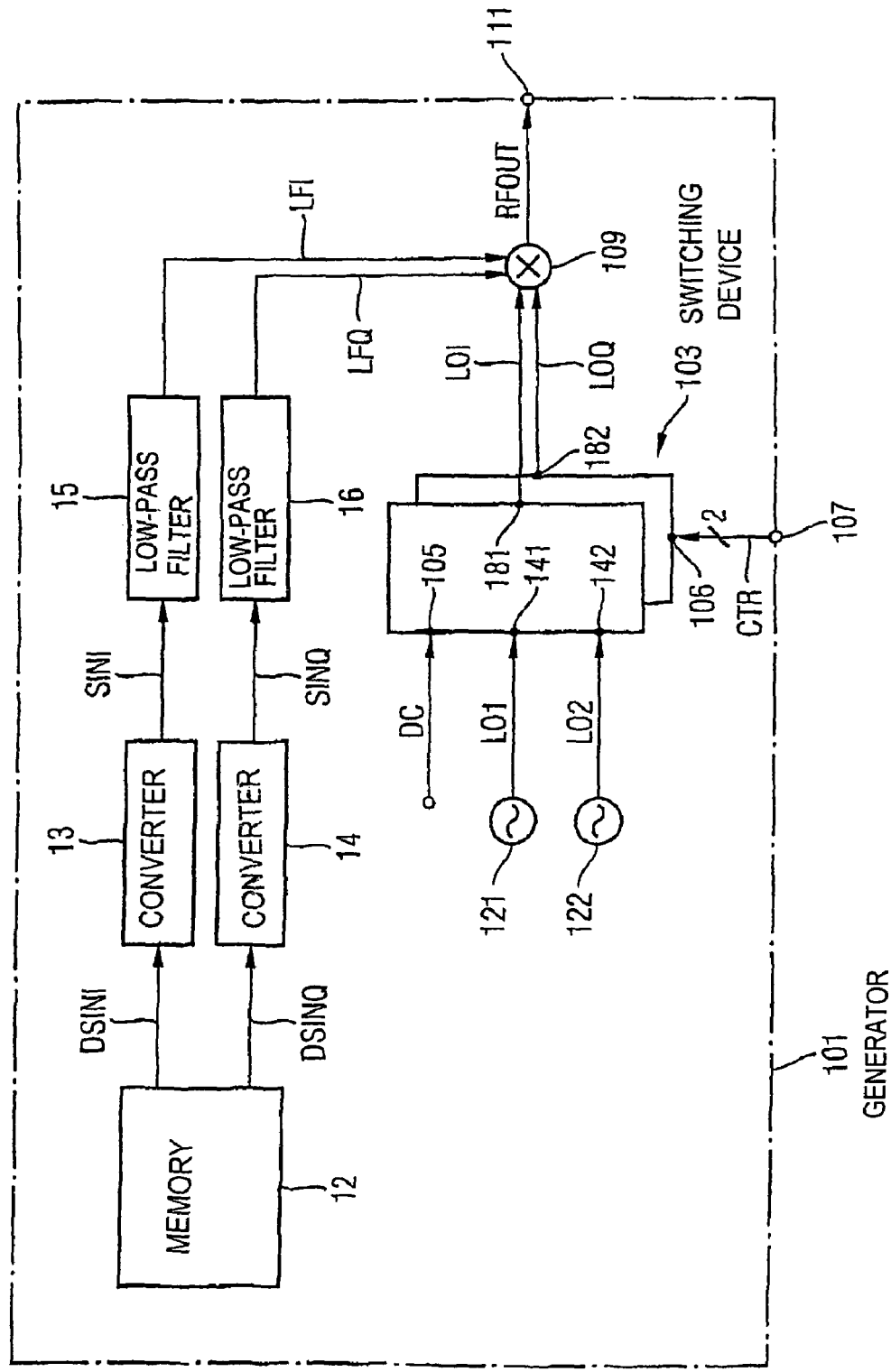
FIG. 4 shows one preferred embodiment of the frequency pattern generator according to the invention.

FIG. 4 shows one preferred embodiment of the frequency pattern generator according to the invention.

The frequency pattern generator 101 has a memory 12, which contains sinusoidal data. The memory 12 is coupled to two digital-to-analog converters 13, 14, the first digital-to-analog converter 13 converting first digital sinusoidal data DSINI to corresponding analog first sinusoidal data SINI and outputting the latter. The second digital-to-analog converter 14 converts second digital sinusoidal data DSINQ (which have been phase-shifted through 90° with respect to the first sinusoidal data) to second analog sinusoidal data SINIQ and outputs the latter.

In this preferred embodiment of the frequency pattern generator 101, the I and Q sinusoidal signal components SINI, SINQ which have been respectively shifted through 90° are needed to generate individual sidebands in the single-sideband mixer topology illustrated here.

Respective low-pass filters 15, 16 which filter the analog sinusoidal signals SINI, SINQ and output them in the form of phase-shifted mixing frequency signals MFI, MFQ are connected downstream of the digital-to-analog converters 13, 14.

A first local oscillator unit 121 and a second local oscillator unit 122 are also provided and respectively output a radio frequency carrier frequency signal LO1, LO2.

A multiplexer arrangement 103 is provided, to the inputs 141, 142 of which the radio frequency carrier frequency signals LO1, LO2 are applied and to one input 105 of which a zero signal DC at a constant potential level, preferably a zero level, is applied. The multiplexer arrangement 103 has one or more control inputs 106 for injecting control signals CTR which are injected into a control input 107 of the frequency pattern generator 101. In a manner dependent on the control signals CTR, the multiplexer arrangement 103 passes on one of the two radio frequency carrier signals LO1, LO2 or the zero signal DC to outputs 181, 182 as local oscillator signals LOI, LOQ which have each been phase-shifted through 90°. The two local oscillator signals LOI, LOQ which have been phase-shifted through 90° and the two mixing frequency signals LFI, LFQ which have been phase-shifted through 90° are supplied to a single-sideband mixer 109, which uses them to mix output signals RFOUT which are routed to an output 111 of the frequency pattern generator.

The local oscillator units 121, 122 are, for example, voltage-controlled LC circuits whose output frequencies can be adjusted by adjusting a voltage. The advantage resides in the fact that LC circuits provide sinusoidal signals as output signals which give rise to practically no higher harmonics in the single-sideband mixing stage 109. The same applies to the analog sinusoidal mixing frequency signals LFI, LFQ which are generated by means of digital-to-analog conversion of the sinusoidal data DSINI, DSINQ. The low-pass filters 15, 16 are used to filter interference which may be generated by the digital-to-analog converters 13, 14.

Figure 5:
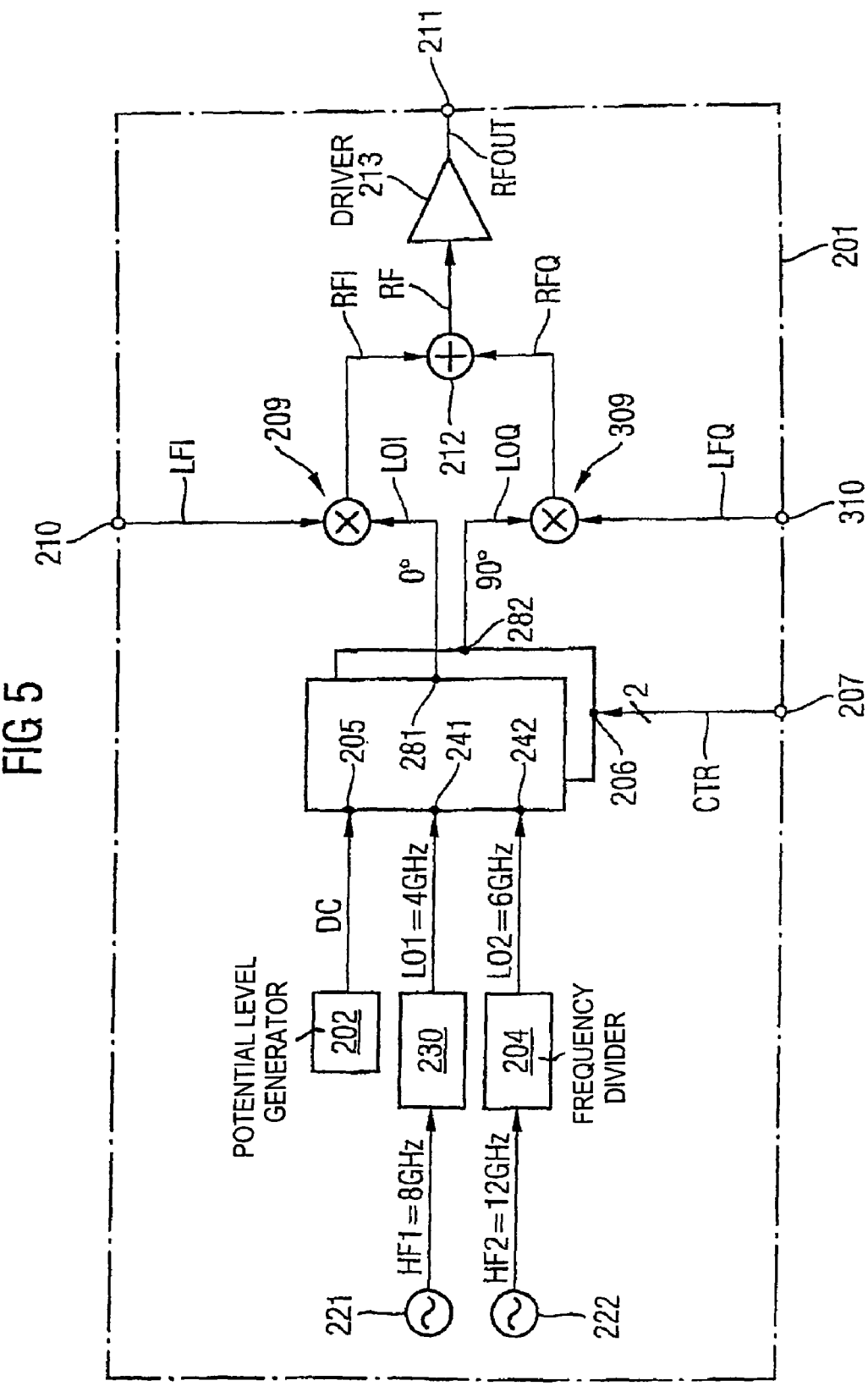
FIG. 5 shows one preferred development of the frequency pattern generator according to the invention.

FIG. 5 shows one preferred development of the frequency pattern generator according to the invention.

The preferred development of the frequency pattern generator 201 has control inputs 207, a first input 210 for injecting a first mixing frequency signal LFI, a second input 310 for injecting a second mixing frequency signal LFQ and an output 211 for outputting a pulsed output signal RFOUT. In this case, the mixing frequency signals LFI, LFQ have been phase-shifted through 90° in this single-sideband mixer topology.

The frequency pattern generator 201 has a first local oscillator unit 221, which generates a radio frequency signal HF1 of 8 GHz, and a second local oscillator unit 222, which generates a second radio frequency signal HF2 of 12 GHz. The radio frequency signals HF1 and HF2 are respectively supplied to frequency dividers 230, 204 which use said signals to form a first radio frequency carrier frequency signal LO1 of 4 GHz and a second radio frequency carrier frequency signal LO2 of 6 GHz.

A multiplexer arrangement 203 is provided, into the inputs 241, 242 of which the first carrier frequency signal LO1 and the second carrier frequency signal LO2 are injected. A zero signal DC that is generated by a DC voltage potential generator 202 is injected into a further input 205 of the multiplexer arrangement.

In a manner dependent on the control signals CTR which are injected into a control signal input 206 of the multiplexer arrangement 203, the multiplexer arrangement 203 respectively passes on one of the carrier frequency signals LO1, LO2 or the zero signal DC to its two outputs 281, 282 as local oscillator signals LOI, LOQ which have been phase-shifted through 90°. A first local oscillator signal LOI is then applied to the first output 281 and a second local oscillator signal LOQ is applied to the second output 282. These two signals have been phase-shifted through 90°.

A first multiplicative mixing stage 209 is provided, at which the first mixing frequency signal LFI and the first local oscillator signal LOI are mixed to form a first mixed signal RFI.

The second mixing frequency signal LFQ and the second local oscillator signal LOQ are routed to a second multiplicative mixing stage 309, which uses said signals to generate a second mixed signal RFQ.

The two mixed signals FRI, RFQ are phase-shifted through 90° and are supplied to an adder 212, which uses the two mixed signals RFI, RFQ to generate an intermediate signal RF. The two multiplicative mixing stages 209, 203 and the adder 212 form a single-sideband mixer. The intermediate signal RF is supplied to a signal driver 213, which amplifies the signal and outputs it as an output signal RFOUT that is routed to the output 211 of the frequency pattern generator 201.

Figure 6:
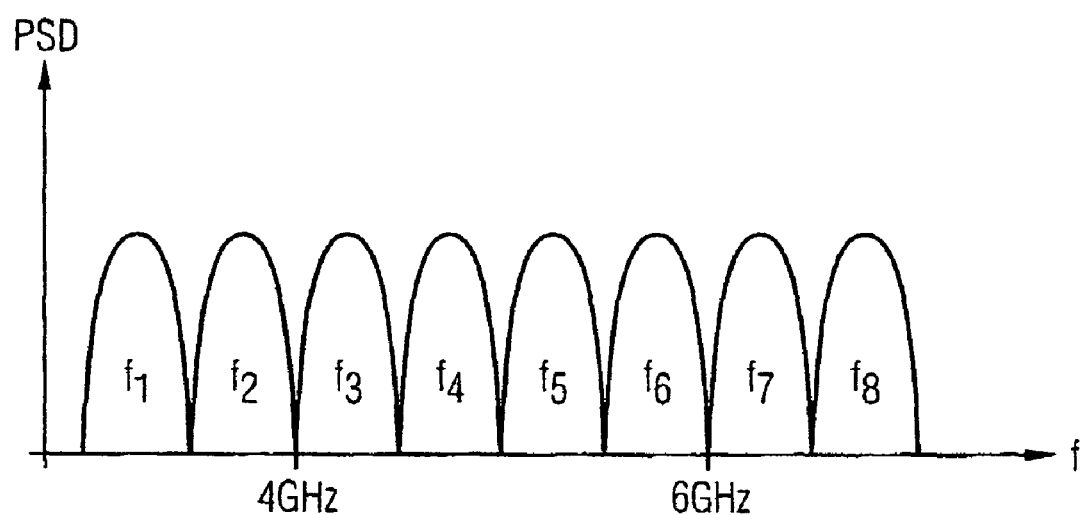
FIG. 6 shows a frequency spectrum of a frequency pattern generator according to the invention.

In this single-sideband topology, the relevant upper or lower sideband can be selected by switching the polarity of one of the mixing frequency signals LFI, LFQ. Selecting the carrier frequency signals LO, LO2 to be 4 and GHz and, for example, selecting the frequencies of the mixing frequency signals LFI and LFQ to be 250 MHz and 750 MHz makes it possible to cover virtually all of the frequencies of UWB applications. FIG. 6 shows an exemplary spectrum that can be generated using the frequency pattern generator 201 shown in FIG. 5.

FIG. 6 shows a corresponding frequency spectrum or a spectral density PSD over a frequency range of 3 to 7 GHz. Switching the carrier frequency signals LO1, LO2 and the zero signal DC in order to generate frequency pulse widths of 4 nanoseconds and pulse pauses (during which the zero signal DC is mixed with the mixing frequency signals LFI, LFQ) of 6 nanoseconds makes it possible to achieve the frequency subbands f1 to f8 for the frequencies stated above.

The invention therefore provides a fast frequency pattern generator that is particularly suited to UWB applications. A power-saving design that can be achieved by means of 0.13 micrometer CMOS copper technology is desirable, in particular, in UWB applications. The frequency pattern generator according to the invention is based primarily on single-sideband mixing of a relatively low-frequency mixing frequency signal and a radio frequency local oscillator signal. Switching local oscillator signals at various frequencies achieves a particularly wide bandwidth without traces of the local oscillator frequency scattering into the output signal. The local oscillator frequencies are switched using a multiplexer, the switching time of which may be less than one nanosecond. The power consumption of a frequency pattern generator according to the invention is merely less than 100 milliwatts for a supply voltage of 1.5 volts. The space occupied, when in the form of an integrated circuit arrangement, is less than one $mm^2$ for the abovementioned 0.13 micrometer CMOS copper technology. The frequency pattern generator according to the invention is therefore particularly suited to UWB applications.

LIST OF REFERENCE SYMBOLS

RFOUT Pulsed output signal
CLK Clock signal
MBG Multiband generator
SBG Subband generator
MUX Multiplexer
LO Local oscillator signal
SSBU/L Single-sideband mixer
MBOUT Output signal
LF, LF1-LFN Mixing frequency signal
DC Zero signal
1, 101, 201 2-1, 2-2, . . . 2-N, Frequency pattern generator
121, 122, 221, 222 Local oscillator unit
3, 103, 203 4-1, 4-2, 4-N 141, 142, 241, 242 Switching device
5, 105, 205 Multiplexer inputs
6, 106, 206 Control input
7, 107, 207 Control input
VPOT Potential level
LO1, LO2, . . . LON Carrier frequency signal
10, 210, 310 Input
9, 109 Mixing stage
LOI, LOQ Local oscillator signal
CTR Control signal
11, 111, 211 Output
12 Memory
13, 14 Digital-to-analog converter
15, 16 Low-pass filter
DSINI, DSINQ Digital sinusoidal data
SINI, SINQ Analog sinusoidal signals
HF1, HF2 Radio frequency signal 202 Potential level generator
230, 204 Frequency divider
209, 309 Multiplicative mixer
212 Adder
213 Driver

The invention claimed is:

1. A frequency pattern generator for generating frequency pulses, said generator comprising:
   (a) a first local oscillator unit configured to generate a first radio frequency carrier frequency signal;
   (b) at least one second local oscillator unit configured to generate at least one second radio frequency carrier frequency signal;
   (c) a switching device configured to generate an LO signal which is selected from one of the first or second radio frequency carrier frequency signals or a zero signal, the selected one of the first or second radio frequency carrier frequency or the zero signals being selected based on a control signal; and
   (d) a mixing stage configured to mix the LO signal with a mixing frequency signal to form a pulsed output signal, the pulsed output signal having frequency pulses at a respective frequency and length in a manner dependent on the control signal, said mixing frequency signal having a lower frequency than the first and second radio frequency carrier frequency signals.

2. The frequency pattern generator according to claim 1, wherein
   the mixing stage includes a single-sideband mixer.

3. The frequency pattern generator according to claim 1, wherein the first local oscillator unit comprises a voltage-controlled LC circuit.

4. The frequency pattern generator according to claim 1, further comprising at least one digital-to-analog converter and a memory containing digital sinusoidal data, wherein the digital-to-analog converter is operably coupled to convert the digital sinusoidal data into an analog mixing frequency signal.

5. The frequency pattern generator according to claim 4, further comprising a low-pass filter connected downstream of the digital-to-analog converter.

6. The frequency pattern generator according to claim 1, wherein the first carrier frequency signal and second carrier frequency signal are at frequencies of between 3 and 9 GHz.

7. The frequency pattern generator according to claim 1, wherein the mixing frequency signal is at a frequency of between 0 and 1 GHz.

8. The frequency pattern generator according to claim 1, wherein the switching device includes a multiplexer.

9. The frequency pattern generator according to claim 1, wherein
   the frequency pattern generator is constructed as an integrated circuit using CMOS technology.

10. An apparatus, comprising:
    (a) a plurality of local oscillators, each configured to generate a carrier frequency signal at a distinct frequency;
    (b) a switching device operably connected to, responsive to a control signal, controllably connect the carrier frequency signal of one of the local oscillators or a DC signal to an output to form a first signal; and
    (c) a mixing stage operably coupled to the output of the switching device, the mixing stage configured to mix the first signal with a mixing frequency signal to form a pulsed output signal, the pulsed output signal having frequency pulses at a length dependent on the control signal, said mixing frequency signal having a lower frequency than the carrier frequency signals.

11. The apparatus of claim 10, wherein the plurality of local oscillators comprises two local oscillators.

12. The apparatus of claim 10, wherein at least one of the local oscillators is a voltage controlled oscillator.

13. The apparatus of claim 12, wherein at least one voltage controlled oscillator is an LC oscillator.

14. The apparatus of claim 10, further comprising a circuit configured to generate a mixing frequency signal.

15. The apparatus of claim 10, wherein:
    the switching device is further operable to controllably provide a phase-shifted orthogonal component of the carrier frequency signal of the one local oscillator to the output; and
    the mixing stage is configured to mix the connected carrier frequency signal and the phase shifted carrier frequency signal with a mixing frequency signal having orthogonal components.

16. The frequency pattern generator according to claim 10, wherein
    the mixing stage includes a single-sideband mixer.

17. The frequency pattern generator according to claim 10, further comprising at least one digital-to-analog converter and a memory containing digital sinusoidal data, wherein the digital-to-analog converter is operably coupled to generate the mixing frequency signal from the digital sinusoidal data.

18. The frequency pattern generator according to claim 17, further comprising a low-pass filter connected downstream of the digital-to-analog converter.

19. The frequency pattern generator according to claim 10, wherein the switching device includes a multiplexer.

20. An apparatus, comprising:
    (a) a plurality of voltage-controlled LC local oscillators, each configured to generate a carrier frequency signal at a distinct frequency;
    (b) a switching device including a multiplexer operably connected to, responsive to a control signal, controllably connect the carrier frequency signal of one of the local oscillators or a DC signal to an output to form a first signal; and
    (c) a mixing stage including a single side-band mixer operably coupled to the output of the switching device, the mixing stage configured to mix the first signal with a mixing frequency signal to form a pulsed output signal, the pulsed output signal having frequency pulses at a length dependent on the control signal, said mixing frequency signal having a lower frequency than the carrier frequency signals.

* * * * *